United States Patent
Kupfer et al.

(10) Patent No.: US 11,292,673 B2
(45) Date of Patent: Apr. 5, 2022

(54) SWITCH DEVICE

(71) Applicant: BAUSCH + STRÖBEL MASCHINENFABRIK ILSHOFEN GMBH + CO. KG, Ilshofen (DE)

(72) Inventors: Timo Kupfer, Obersontheim (DE); Daniel Spieler, Crailsheim (DE)

(73) Assignee: BAUSCH + STRÖBEL MASCHINENFABRIK ILSHOFEN GMBH + CO. KG, Ilshofen (DE)

( * ) Notice: Subject to any disclaimer, the term of this patent is extended or adjusted under 35 U.S.C. 154(b) by 0 days.

(21) Appl. No.: 16/967,021

(22) PCT Filed: May 16, 2019

(86) PCT No.: PCT/EP2019/062571
§ 371 (c)(1),
(2) Date: Aug. 3, 2020

(87) PCT Pub. No.: WO2019/233723
PCT Pub. Date: Dec. 12, 2019

(65) Prior Publication Data
US 2021/0362958 A1    Nov. 25, 2021

(30) Foreign Application Priority Data
Jun. 6, 2018 (DE) ............ 10 2018 208 956.6

(51) Int. Cl.
*B65G 47/64* (2006.01)
*B65G 47/84* (2006.01)
(Continued)

(52) U.S. Cl.
CPC ......... *B65G 47/64* (2013.01); *B65G 21/2072* (2013.01); *B65G 47/8884* (2013.01); *B65G 47/846* (2013.01); *B65G 2811/0678* (2013.01)

(58) Field of Classification Search
CPC .... B65G 21/2072; B65G 29/00; B65G 47/64; B65G 47/84; B65G 47/8884
(Continued)

(56) References Cited

U.S. PATENT DOCUMENTS 2,269,422 A * 1/1942 Ayars ............... B65B 61/28
                                                198/480.1
2,500,465 A * 3/1950 Meyer ............ B67C 7/0006
                                                198/478.1
(Continued)

FOREIGN PATENT DOCUMENTS

DE          1084640 B       6/1960
DE     102013223977 A1      5/2015
(Continued)

OTHER PUBLICATIONS

International Application No. PCT/EP2019/062571, International Search Report and Written Opinion dated Sep. 27, 2019, 13 pages.

*Primary Examiner* — Douglas A Hess
(74) *Attorney, Agent, or Firm* — Kilpatrick Townsend & Stockton LLP

(57) ABSTRACT

The present disclosure relates to a switch device for a transfer point between a first and a second rotatable star wheel, at which transfer point objects can be transferred selectively from the first star wheel to the second star wheel. The switch device includes a base in the region of the transfer point for supporting the objects transported by the star wheels; a first and a second wall portion that extend in the region of the transfer point; a drive mechanism for driving the movement of the wall portions; and a control means for actuating the drive mechanism. The first and the second wall portions are individually vertically movable by the at least one drive mechanism.

15 Claims, 3 Drawing Sheets

Figure 1:
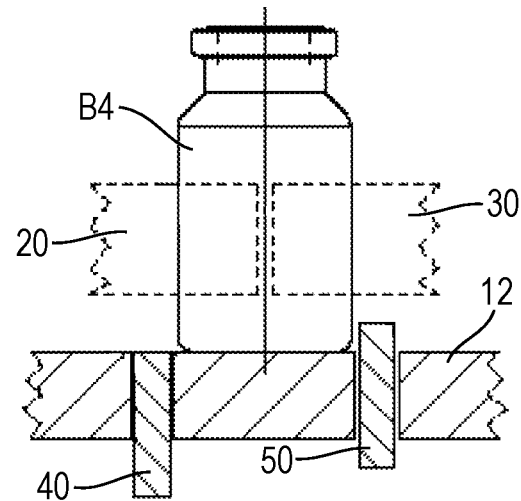

(51) Int. Cl.
*B65G 29/00* (2006.01)
*B65G 21/20* (2006.01)
*B65G 47/88* (2006.01)

(58) Field of Classification Search
USPC .......................... 198/367.1, 441, 469.1, 608
See application file for complete search history.

(56) References Cited

U.S. PATENT DOCUMENTS

| | | | | |
|---|---|---|---|---|
| 4,295,558 A * | 10/1981 | Heckmann | ........... | B65G 47/846 |
| | | | | 198/367 |
| 4,467,908 A * | 8/1984 | Schneider | ............ | B65G 47/846 |
| | | | | 198/441 |
| 5,441,063 A * | 8/1995 | Fernandez | ................ | B08B 9/32 |
| | | | | 134/142 |
| 6,213,309 B1 * | 4/2001 | Dadisho | ................ | B67C 7/0013 |
| | | | | 209/523 |
| 6,257,820 B1 * | 7/2001 | Veltman | .................. | A23L 3/001 |
| | | | | 198/605 |
| 6,446,781 B1 | 9/2002 | De Villele | | |
| 7,200,975 B2 * | 4/2007 | Till | ....................... | B65G 47/846 |
| | | | | 198/441 |
| 7,891,397 B2 * | 2/2011 | Kramer | ................. | B65C 9/1819 |
| | | | | 156/538 |
| 8,657,101 B2 * | 2/2014 | Zoni | ................... | B65G 47/5136 |
| | | | | 198/608 |
| 9,187,262 B2 * | 11/2015 | Fahldieck | ............. | B67C 7/0046 |
| 9,688,483 B2 * | 6/2017 | Graffin | .................. | B65G 29/00 |
| 10,773,446 B2 * | 9/2020 | Bast | ..................... | B29C 49/4273 |
| 10,987,719 B2 * | 4/2021 | Kurosawa | .............. | B21D 51/30 |

FOREIGN PATENT DOCUMENTS

| | | |
|---|---|---|
| DE | 102016200150 A1 | 7/2017 |
| EP | 3178765 A1 | 6/2017 |
| JP | 5699123 A | 8/1981 |
| JP | 6186308 A | 5/1986 |
| WO | 2015000680 A1 | 1/2015 |

* cited by examiner

SWITCH DEVICE

CROSS-REFERENCE TO RELATED APPLICATIONS

This application is a U.S. national phase of International Patent Application No. PCT/EP2019/062571 filed on May 16, 2019, which claims the benefit of German Patent Application No. 102018208956.6, filed on Jun. 6, 2018, the contents of which are incorporated herein by this reference.

The present invention relates to a switch device for a transfer point between a first and a second rotatable star wheel, at which transfer point objects can be selectively transferred from the first star wheel to the second star wheel.

It should be noted that the term "star wheel" is to be interpreted broadly in the entire present invention, such that it is intended to mean not only strictly circular transport units, but also transport units of which the outer peripheral shape deviates from a circle and, for example, are flattened in portions or have differently convex portions. In extreme cases, this could even include completely straight transport units, which can be considered to be "wheels" having an infinite diameter, in which case transfer from a linear transport unit to a circular transport unit, for example, can be provided and is also intended to be covered by the present application. In any case, other than switch devices which are used to transfer objects to a star wheel or to transfer them from the star wheel to another transport device, devices such as guide rails are to be provided, at least in convex portions, by means of which devices the objects are held on the corresponding star wheel.

The switch devices in question are used, inter alia, in the packaging industry and also, for example, in the chemical and pharmaceutical industries, in order to be able to select objects according to their characteristics, i.e. to be able to sort individual objects from a series of similar objects, for example if they are defective or the like.

Such objects that have been identified as defective can then, for example, be supplied to another path downstream of a device which has detected the defectiveness of the particular object. For this purpose, objects are guided on the outer periphery of the above-mentioned star wheels and optionally transferred from a first star wheel, from which they are delivered to a corresponding transfer point, to a second star wheel at this point, from which second star wheel they are moved to another path, or they remain on the first star wheel, in order to then also be removed from the transfer point. It goes without saying that the term "transfer point" is not intended to be understood in strictly geometric terms, but rather that the transfer can also take place on an extended strip-like region along the movement of the objects.

For this purpose, various switch devices are already known from the prior art, for example vacuum wheels, in which the objects are held on the outer periphery of the respective star wheels by means of vacuum grippers, which can then be selectively switched such that, at the transfer point, a corresponding object either remains on the first vacuum star wheel or is transferred to a second vacuum star wheel, such that the object can subsequently be removed on a desired path. Although such vacuum-operated switch devices work reliably and can be safely operated at the respective star wheels even with a relatively small object spacing, they cannot always be used in clean rooms or in an isolator, since from a pharmaceutical point of view, for example, the highly sensitive objects and their contents could be contaminated due to possible external contamination from components such as hoses, vacuum pumps, valves, etc.

In many applications for generic switch devices of this kind, therefore, only mechanical switches can be used, as known from DE 10 2013 223 977 A1 for example. This document discloses a device which, between two star wheels, fulfils a switch function at a transfer point and comprises for this purpose a one-piece pivotable element having a guide means for the objects supported by the star wheels, which element is pivotable such that either the objects remain on the first star wheel or the objects are transferred to the second star wheel. Nevertheless, in order to ensure sufficient guiding of the objects, the guide element mentioned is relatively long, and therefore can reliably prevent the objects from tilting during transfer. However, this also achieves relatively high inertia of the switch function, because in order to be able to select successive objects effectively at all, only a single object may be inside the guide device at a time. Therefore, a minimum distance between two objects on the star wheels is automatically fixed by the length of the guide element, such that in this case relatively large distances and therefore a relatively low throughput of objects for each unit of time at a predetermined rotation speed of the star wheels must be provided. This is clearly at the expense of the efficiency of the system, making it more expensive to operate. Moreover, with the device from DE 10 2013 223 977 A1 there is the danger that the pivoting movement of the guide element can be blocked by penetrating dirt or, for example, broken pieces of damaged objects.

The object of the present invention is therefore to provide a switch device of the type in question which operates purely mechanically and therefore can be also used in environments in which vacuum-operated switches cannot be used due to the risk of contamination, which allows a safe switch function with smaller object distances and therefore a higher output capacity of the system, and which finally also eliminates the risk of obstructing a guide element by refraining from pivoting such an element.

In order to achieve this object, the switch device according to the invention has a base at least in the region of the transfer point for supporting the objects transported by the star wheels, a first and a second wall portion, which extend, in the region of the transfer point, so as to substantially follow the outer periphery of the first and second star wheels, respectively, and are movable in the vertical direction between a first position, in which they extend beyond the base, and a second position, in which they do not extend beyond the base, at least one drive mechanism for driving the movement of the wall portions, and a control means for actuating the at least one drive mechanism, the first and second wall portions each being individually vertically movable by the at least one drive mechanism.

By dispensing with a pivoting guide element and using vertically movable wall portions, the distance between the objects supported by the star wheels can be selected so as to be smaller and as a result, as described as above, the output capacity can be increased, and the risk of obstructing the device is eliminated, as the retractable wall portions are substantially less sensitive to the penetration of dirt and contaminants due to suitable gap dimensions.

In an advantageous embodiment, the first wall portion and the second wall portion can each be divided into at least two wall elements along the extension thereof, which wall elements are each individually vertically movable by the at least one drive mechanism. In this case, both the shape and the number of wall portions, which can certainly also be greater than two, can be adapted to the shape of the objects to be transported.

These wall portions, which are each designed as at least two wall elements, make it possible to achieve a reliable switch function even for objects which have a smaller distance on the outer periphery of the star wheels.

This advantage of the switch device according to the invention becomes even clearer if the first and second wall portions are each divided into three wall elements, in which, for example, the ratio of the lengths of the three wall elements of the first and second wall portions with respect to the extension thereof is approximately 2:1:1 in each case. In this case, the length of the first wall element can be in particular approximately identical to the diameter of the objects to be carried by the star wheels.

In order to ensure particularly safe operation of the switch device according to the invention with regard to possible tilting of objects or deposits of foreign substances, the wall portions can each be aligned with the base in their second position in order to form a continuous flat surface.

In a possible embodiment, each of the wall elements can be assigned its own drive mechanism, for example an electromechanical drive, in particular a servomotor, or a pneumatic drive, for example. Since such electromechanical servomotors mentioned by way of example have recently become highly cost-effective and can be highly precisely operated with minimal effort, they are an optimal option for moving the individual wall elements.

Alternatively, however, more complex mechanical arrangements could also be used, in which a smaller number of drive mechanisms than wall elements are provided and the movement of each of these drive mechanisms is then converted into coordinated movements of the individual wall elements by the mechanical means mentioned.

According to a second aspect, the present invention relates to a transport device for objects, in particular cylindrical objects such as bottles and/or ampoules, comprising a first and a second star wheel, which are arranged such that a transfer point is formed therebetween, and to a switch device according to the invention for selectively transferring objects from the first star wheel to the second star wheel. By slightly adapting the geometries of the star wheels and of the switch device, in particular of the wall portions, even objects having a more complex shape can be transported using the device according to the invention, however.

In this case, the control means can be operatively coupled to a control unit for the two star wheels such that the transfer of the wall elements is adapted or can be adapted to the rotation speed of the star wheels. Alternatively, the control unit could, however, also be coupled to a sensor for detecting the rotation of the star wheels, such that the switch device can be operated autonomously with regard to controlling the rotation of the star wheels.

Furthermore, the transport device according to the invention can comprise at least one guide rail which extends in an extension of at least one of the wall portions. This can ensure that the objects can be transported further along their provided paths upstream and/or downstream of the transfer point.

Finally, it should also be noted that the transport device according to the invention can be modular, in order to be adaptable to different geometries and dimensions of the objects to be transported. For this purpose, for example, a system consisting of a plurality of pairs of star wheels, which are each matched to a type of object, and an associated switch device in each case can be provided, which is also matched to the corresponding objects in terms of the number of its wall elements and its geometries as well as its actuation. Therefore, in the event that the type of objects to be transported is to be changed during operation of the system, the star wheels and the switch device can be replaced at the same time, while other components such as drives and feed or discharge devices for the objects can remain unchanged.

Further features and advantages of the present invention are clear from the following description of an embodiment when considered in conjunction with the accompanying drawings, in which:

FIG. 1 is a front view of a cylindrical object at the transfer point of a transport device according to the invention;

FIG. 2*a* to 2*e* are plan views of a transport device according to the invention at five consecutive points in time during transfer of the object from FIG. 1.

FIG. 1 first shows an object B4 in a front view, which object is currently at a transfer point C of a transport device 10 according to the invention, which transfer point can be seen more clearly in FIG. 2*a* to 2*e*. The object B4 is a substantially cylindrical container, such as is used in the pharmaceutical industry, for example. It goes without saying that in one variant of the device shown in the drawings, it would also be possible to use said device together with other object geometries.

In FIG. 1, the object B4 is guided so as to be supported on a base 12 and is currently in contact with a first and a second transport wheel 20, 30, which wheels are also responsible for propelling the object B4. As can be seen more easily from the subsequent drawings, the object B4 is currently accommodated in recesses 22, 32 in the two star wheels 20 and 30 in the same way.

Moreover, two wall elements 40 and 50, which form the switch device according to the invention in the transport device shown, are integrated in the base 12. In the state shown in FIG. 1, the first wall portion 40 is inserted into the base 12 from below, such that the upper face thereof is aligned in a planar manner with the base 12, while the upper face of the second wall portion 50 is raised above the base 12. The necessary movement between the projecting first position, in which the second wall portion 50 is currently located, and the retracted second position, in which the first wall portion 40 is currently located, is produced in this case by individually actuated drives (not shown), for example electromechanical servomotors, which are actuated in a coordinated manner by a control means (also not shown). It is clear that the protruding second wall portion 50 is a guide means for the object B4 in the lateral direction, whereas the object B4 could simply slide away over the retracted first wall portion 40.

As can be seen in FIG. 2*a* to 2*e*, the wall portions 40 and 50 therefore function as a switch device for objects received at the transport wheels 20 and 30, i.e. objects delivered from the first star wheel 20. For clarification, a total of eight such objects B1 to B8 are shown in FIG. 2*a* to 2*e*, of which the object B4, which is currently located at the transfer point C, has already been shown in FIG. 1 and described above. Furthermore, in each of FIG. 2*a* to 2*e* the direction of rotation of the two star wheels 20 and 30 is shown by means of appropriate arrows and provided with the reference signs R1 and R2. In this case, the first star wheel 20 rotates clockwise and the second star wheel rotates counter-clockwise, the series of objects B1 to B8 being correspondingly guided from the first star wheel 20, as already mentioned, to the second star wheel 30 until they are in contact with both star wheels 20 and 30 at the transfer point C. Moreover, it should be noted that the above-mentioned recesses 22 and 32 on the outer peripheries of the star wheels 20 and 30 are equally spaced, specifically each by an angle α with respect to the entire periphery of the star wheels 20 and 30.

In order to carry out the above-mentioned switch function, by means of which individual objects B1 to B8 can be selectively transferred from the first star wheel 20 to the second star wheel 30, the first and second wall portions 40 and 50 already mentioned are provided, where in each of FIG. 2a to 2e, the wall elements in the first position, i.e. extended upwards from the base 12, are shown with cross-hatching, and the wall elements in the second position, i.e. retracted into the base 12, are shown only with their contours.

Furthermore, it can also be seen in FIG. 2a to 2e that the two wall portions 40 and 50 are each formed in multiple parts, namely are each formed in three parts with three wall elements 42, 44 and 46 and 52, 54 and 56, respectively. In this case, the wall portions substantially follow circular path segments that are offset outwards with respect to the outer periphery of the corresponding star wheel 20 or 30 by half the diameter of the objects B1 to B8, such that the objects B1 to B8 received in the recesses 22 or 32 are guided straight along the outer periphery of the corresponding star wheel 20 or 30 by the guiding effect of the wall portions 40 or 50. The length of the individual wall elements 42 to 46 and 52 to 56 is selected in each case substantially in the ratio 2:1:1 with respect to the radius of the objects B1 to B8, which allows particularly small distances between the objects B1 to B8 on the outer peripheries of the star wheels 20 and 30, as is clear from the following description of a switching process. Although the drawings show a device having wall portions 40 and 50 each divided into three parts, it goes without saying that these portions could also be divided into one, two or more parts in a variant of an embodiment according to the invention.

Figure 2A:
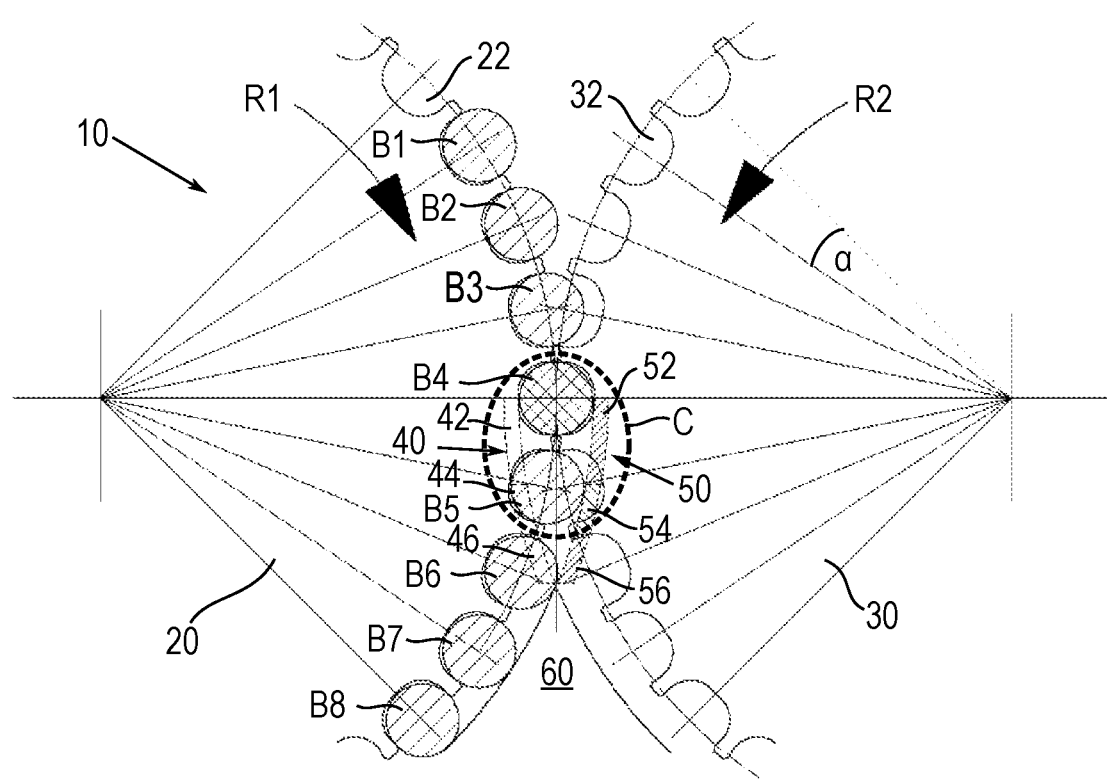

Starting from FIG. 2a, it can be seen that the objects B5 to B8 have already passed through the transfer point C, without having been transferred from the first star wheel 20 to the second star wheel 30. For this purpose, all the wall elements 52 to 56 of the second wall portion 50 were in their respective first positions, i.e. they extended upwards from the base 12 and formed a guide surface for guiding the objects B5 to B8 along the curvature of the first star wheel 20, while the wall elements 42 to 46 of the first wall portion 40 were retracted into the base 12 in their second position, so that the objects B5 to B8 could slide over them.

Figure 2B:
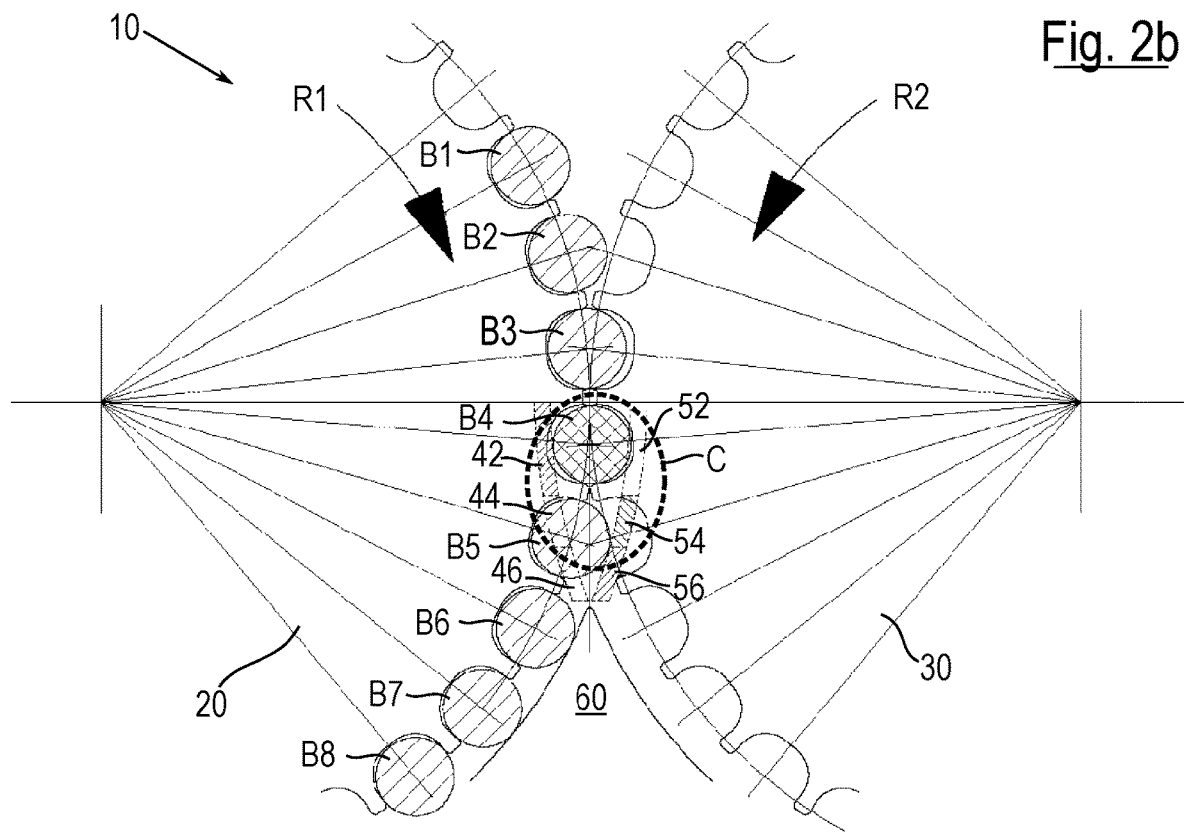

Now, however, the object B4, which is currently located at the transfer point C, is to be transferred to the second star wheel 30. This transfer process is shown in FIG. 2b to 2e. First, as shown in FIG. 2b, the respective first wall elements 42 and 52 are transferred to their respective other positions, i.e. the wall element 42 to its first position and the wall element 52 to its second position. The first wall element 42 of the first wall portion 40 is therefore used as a guide surface for the object B4, while the wall elements 54 and 56, which remain in their first position, continue to be used as a guide surface for the object B5 remaining on the first star wheel 20.

Figure 2C:
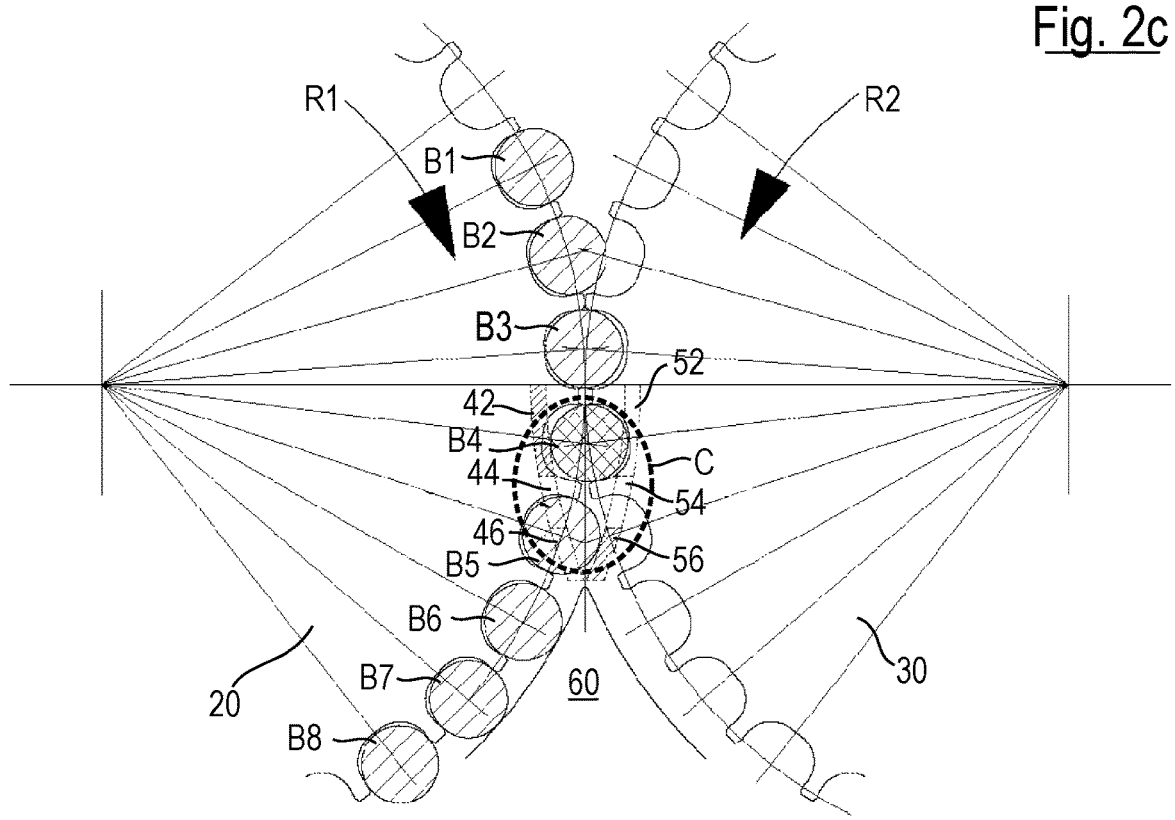
Figure 2D:
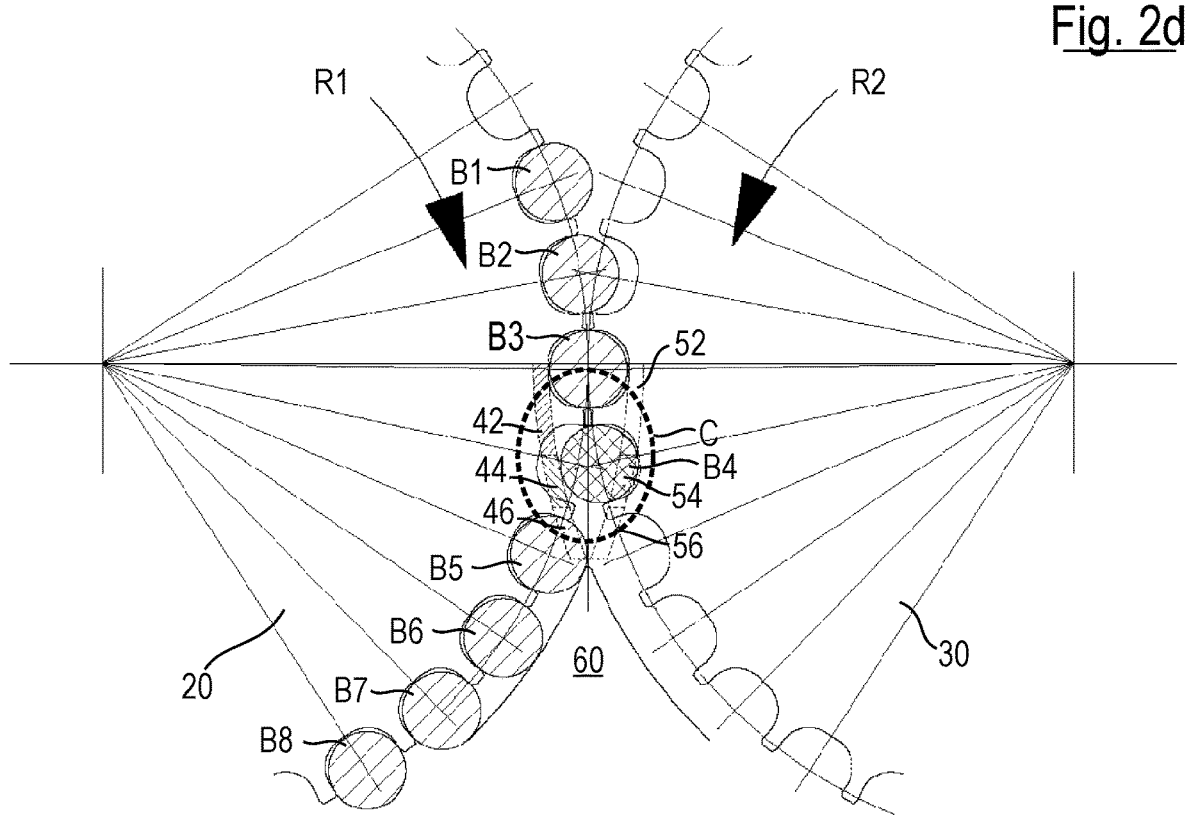

Subsequently, after the two star wheels 20 and 30 have passed through a predetermined amount of rotation, the switch device is transferred into the state shown in FIG. 2c, in which the second wall element 54 of the second wall portion 50 has also been transferred into its second position, so that in the region of the respective second wall elements 44 and 54 there is no guide surface for the two objects B4 and B5 currently located there. Correspondingly, the object B4 continues to be guided only by the first wall element 42 of the first wall portion 40 and the object B5 continues to be guided only by the third wall element 56 of the second wall portion 50, while opposite movements of the objects B4 and B5 are possible in the region of the respective second wall elements 44 and 54.

In addition, after the object B5 has passed out of the region of the second wall element 44 of the first wall portion 40, this second wall element 44 is also transferred into its first position, in order to provide a guide surface for the object B4 which is entering its region at this very moment. Substantially simultaneously, the object B5 passes out of the region of the third wall element 56 of the second wall portion 50 and enters the region of a downstream guide rail 60, which begins substantially behind the transfer point C at a point at which the switching process for the objects B1 to B8 is completed.

Figure 2E:
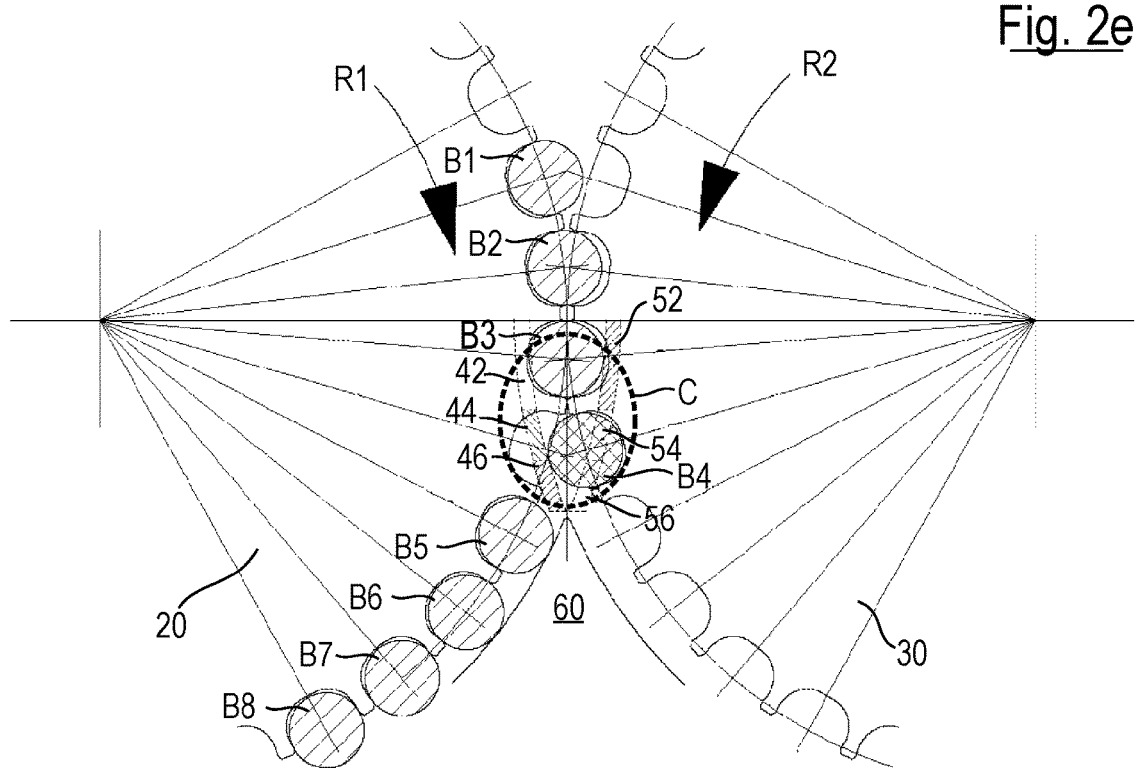

As guiding by means of the third wall element 56 is therefore no longer necessary, said wall element can also be transferred into its second state, such that, as shown in FIG. 2e, the object B4 can pass over the element. After the object B5 is then guided only by the guide rail 60, the third wall element 46 of the second wall portion 40 can finally be transferred to its first position in order to finally transfer the object B4 to the second star wheel 30. The object B4 transferred to this second star wheel 30 is then guided further by the guide rail 60, until it can finally be removed from the second star wheel 30 at a later position and transported further.

Meanwhile, another subsequent object B3 has entered the transfer point C, which in turn is to remain at the first star wheel 20, which is why the two first wall elements 42 and 52 have each been transferred back to their second and first positions, respectively, in order to guide the object B3 along the first star wheel 20.

As can be seen from FIG. 2a to 2e, the provision and coordinated operation of the wall portions 20 and 30 each divided into three parts can achieve a very small distance between the individual objects B1 and B8, while the switch device ensures reliable implementation of the switch function.

The invention claimed is:

1. A switch device for a transfer point between a first rotatable star wheel and a second rotatable star wheel, at which transfer point objects can be selectively transferred from a first rotatable star wheel to the second rotatable star wheel, the switch device comprising:
   a base at least in a region of the transfer point for supporting objects transported by the rotatable star wheels;
   a first and a second wall portion, which extend, in the region of the transfer point, so as to substantially follow an outer periphery of the first and second rotatable star wheels, respectively, and are movable in a vertical direction between a first position, in which the first and second rotatable star wheels extend beyond the base, and a second position, in which the first and second rotatable star wheels do not extend beyond the base;
   a drive mechanism for driving movement of wall portions; and
   a control means for actuating the drive mechanism wherein the first and second wall portions are each individually vertically movable by the drive mechanism.

2. The switch device according to claim 1, wherein the first and second wall portions are each divided into at least two wall portions along an extension thereof, wherein the first and second wall portions are each individually vertically movable by the drive mechanism.

3. The switch device according to claim 2, wherein the first and second wall portions are each divided into three wall elements.

4. The switch device according to claim 3, wherein a ratio of a length of the three wall elements of the first and second wall portions with respect to the extension thereof is approximately 2:1:1.

5. The switch device according to claim 3, wherein each of the wall elements is assigned a respective drive mechanism, for example an electromechanical servomotor.

6. The switch device according to claim 2, wherein the wall portions are each aligned with the base in the second position in order to form a continuously flat surface.

7. A transport device for objects, the transport device comprising a first and a second star wheel arranged in a manner that a transfer point is formed between the first star wheel and the second star wheel, and comprising a switch device for selectively transferring objects from the first star wheel to the second star wheel, the switch device comprising:
- a base at least in a region of the transfer point for supporting objects transported by the star wheels;
- a first and a second wall portion, which extend, in the region of the transfer point, so as to substantially follow an outer periphery of the first and second star wheels, respectively, and are movable in a vertical direction between a first position, in which the first and second wall portions extend beyond the base, and a second position, in which they do not extend beyond the base;
- at least one drive mechanism for driving movement of the first and second wall portions; and
- a control means for actuating the at least one drive mechanism, wherein the first and second wall portions are each individually vertically movable by the at least one drive mechanism.

8. The transport device according to claim 7, wherein the first and second wall portions are each divided into three wall elements, and wherein the control means is operatively coupled to a control unit for the first star wheel and the second star wheel such that a transfer of the wall elements is or can be adapted to a rotation speed of the star wheels.

9. The transport device according to claim 7, further comprising a guide rail which extends in an extension of at least one of the first and second wall portions.

10. The transport device according to claim 7, wherein the objects comprise cylindrical objects, bottles, or ampoules.

11. A switch device comprising:
- a base at a region of a transfer point for supporting objects transported by a first rotatable star wheel and a second rotatable star wheel; and
- a first wall portion and a second wall portion, wherein the first wall portion and the second wall portion each extend in the region of the transfer point so as to substantially follow an outer periphery of the first and second rotatable star wheels respectively, and are movable in a vertical direction between a first position, in which the first and second rotatable star wheels extend beyond the base, and a second position, in which the first and second rotatable star wheels do not extend beyond the base, and wherein the first and second wall portions are each divided into two additional wall portions that are individually vertically movable by a drive mechanism.

12. The switch device according to claim 11, wherein the first and second wall portions are each divided into three wall elements.

13. The switch device according to claim 12, wherein a ratio of a length of the three wall elements of the first and second wall portions with respect to an extension thereof is approximately 2:1:1.

14. The switch device according to claim 12, wherein each of the wall elements is assigned a respective drive mechanism, for example an electromechanical servomotor.

15. The switch device according to claim 11, wherein the first and second wall portions are each aligned with the base in the second position in order to form a continuously flat surface.

* * * * *